April 2, 1957 P. J. H. JANSSEN 2,787,709

CIRCUIT FOR SYNCHRONISING SAWTOOTH OSCILLATOR

Filed July 31, 1953

INVENTOR
PETER JOHANNES HUBERTUS JANSSEN

BY [signature]

AGENT

United States Patent Office 2,787,709

Patented Apr. 2, 1957

2,787,709

CIRCUIT FOR SYNCHRONISING SAWTOOTH OSCILLATOR

Peter Johannes Hubertus Janssen, Eindhoven, Netherlands, assignor, by mesne assignments, to North American Philips Company, Inc., New York, N. Y., a corporation of Delaware Application July 31, 1953, Serial No. 371,515

Claims priority, application Netherlands September 8, 1952

3 Claims. (Cl. 250—36)

This invention relates to circuits for synchronizing a sawtooth oscillator to a pulsatory control voltage, a voltage derived from the oscillator and the control voltage being supplied to a phase-comparison stage, the output voltage of which controls the oscillator frequency, and the fly-back of the sawtooth oscillation produced by the oscillator having a substantially cosine shape.

In such known circuits it has been common practice hitherto to compare the phase of the pulsatory control voltage with the phase of a sawtooth, pulsatory or sine-shaped voltage derived from the oscillator circuit.

In many cases, and more particularly in television receivers, it is important that the control voltage required for controlling the oscillator frequency should be obtained at a minimum variation in phase-shift, since such a shift in television receivers brings about a proportional displacement of the television image on the screen of the picture tube.

Consequently, in television receivers, in most cases a sawtooth voltage is derived from the oscillator, since in the region of the fly-back of the sawtooth voltage, in which region the phase comparison substantially always takes place, a comparatively small difference in phase brings about a variation in control voltage much greater than may be obtained, for example, with a sine-shaped voltage having the same amplitude from top to top.

However, even in this case, a certain shift may occur, which is about 17.5% of the total width of the television frame.

The object of the circuit according to the invention is to diminish such a shift and for this purpose use is made of the fact that the fly-back of the sawtooth oscillation produced by the oscillator has a substantially cosine-shaped form, which is frequently the case, as will be explained more fully hereinafter.

The circuit according to the invention is characterized in that the voltage derived from the oscillator, before being supplied to the phase-comparison stage, is converted with the use of at least one differentiating network into a voltage which is substantially zero before and after the fly-back period and which assumes a predetermined value at the beginning of this period and which subsequently changes in a substantially cosine-shaped manner to the opposite value to return substantially to zero at the end of the said period.

In order that the invention may be readily carried into effect, it will now be described with reference to the accompanying drawing showing, by way of example, some embodiments thereof.

Figure 1:
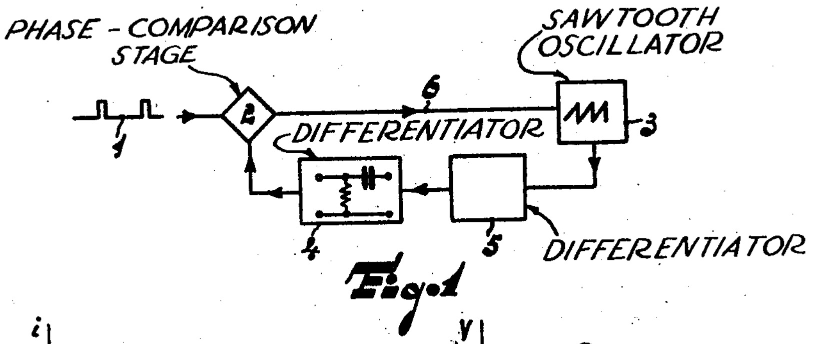
Fig. 1 shows diagrammatically one embodiment of the circuit according to the invention.

In the circuit shown in Fig. 1, the pulsatory control voltage 1 is supplied to the phase-comparison stage 2. An oscillation derived from the sawtooth oscillator 3 is also supplied to the phase-comparison stage 2 by way of a circuit comprising at least one differentiating network 4, such as is the case if the oscillator 3 comprises an output circuit in which a sawtooth current flows through an inductance coil and the derived voltage is taken from the coil concerned.

If the oscillator 3 generates a sawtooth voltage which is supplied back to the phase-comparison stage 2, the supply circuit comprises, in addition to the differentiating network 4, a differentiating network 5.

The output voltage of the phase-comparison stage 2 is supplied as a control voltage, by way of a lead 6, to the oscillator 3.

Figures 2, 3, 4, 5, 6, 7:
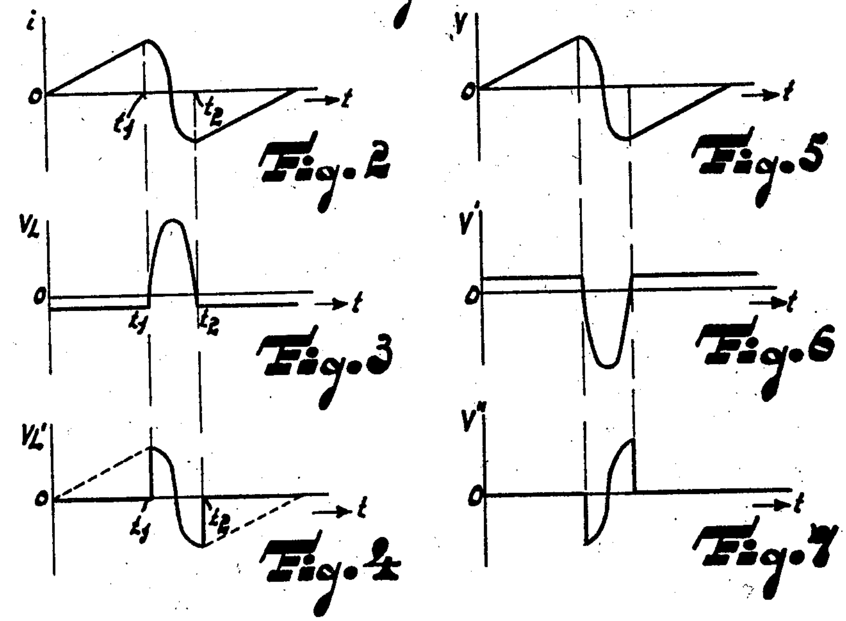
Fig. 2 shows the shape of the sawtooth current supplied by an oscillator for producing deflection currents.
Fig. 3 shows the voltage set up across a coil by such a current.
Fig. 4 shows the voltage which occurs after differentiation of the voltage shown in Fig. 3.
Fig. 5 shows the shape of the output voltage of an oscillator for generating a sawtooth voltage.
Fig. 6 shows the voltage which occurs when the voltage of Fig. 5 is differentiated.
Fig. 7 shows the voltage which occurs when the voltage of Fig. 6 is differentiated.

If the oscillator 3 generates a sawtooth current which flows through a deflection coil, the current $i$ traversing the said coil has the shape shown as a function of the time $t$ in Fig. 2, the current increasing linearly with the time $t$ until at the moment $t_1$ the fly-back occurs whereby the current traversing the coil shows a substantially cosine-shaped variation as a result of the oscillation carried out by the coil and the natural capacity which occurs in parallel therewith. Said oscillation ceases at the end of the fly-back at the moment $t_2$ and the current again increases linearly with time.

The variation of the voltage $V_L$ set up across the coil is shown in Fig. 3, from which it follows that this voltage shows a pulsatory variation during the fly-back, the pulse being substantially sine-shaped.

A specific sawtooth oscillator circuit 3 which produces the waveshapes shown in Figs. 2 and 3, is described in Philips Technical Review, vol. 10, No. 10, April 1949, on pages 307 to 317. In this reference article, Fig. 11 on page 312 shows a schematic electrical diagram of the sawtooth oscillator, and Figs. 7(*b*) and 7(*c*) on page 310 show the produced waveshapes which are shown in Figs. 2 and 3 of the drawing.

It may be mentioned that this pulse is frequently integrated in known circuits so as to produce a sawtooth voltage which is supplied back to the phase-comparison stage. The resultant sawtooth voltage shows an opposite variation to the shape shown for the current $i$ in Fig. 2.

However, in the circuit according to the invention, the voltage variation shown in Fig. 3 is differentiated instead of integrated so as to obtain the voltage $V_L'$ shown in Fig. 4.

For the sake of clearness, Fig. 4 also shows in dotted lines the integrated voltage variation with opposite polarity.

From this it follows that the integrated and differentiated voltage variations during the fly-back period from $t_1$ to $t_2$ are identical at the same amplitude.

However, the differentiated voltage outside the said period is substantially zero, whereas the integrated voltage increases linearly with time. Consequently, interfering pulses which occur between the pulses of the control voltage 1 cannot exert any influence when use is made of the differentiated voltage, this incontradistinction with the case in which use is made of the integrated voltage. When using the differentiated voltage variation it is thus possible materially to increase the amplitude of the voltage without the sensitivity to interference being increased, which is not practicable with the integrated voltage. During the fly-back period from $t_1$ to $t_2$ a greater amplitude of a cosine-shaped variation thus ensues, the slope of which is much higher than that obtained if the integrated voltage is used.

Figure 8:
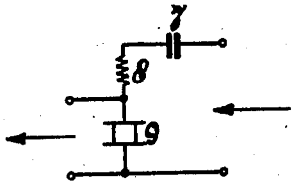
Fig. 8 shows another embodiment of a differentiating network which may be used in the circuit of Fig. 1.

The slope may be considerably increased if the differentiating network comprises a resistor which is dependent upon voltage. Such a network is shown in Fig. 8 and comprises the series-combination of a capacitor 7, a resistor 8 and a voltage-dependent resistor 9, which series combination has supplied to it the input signal. The output voltage is derived from the voltage-dependent resistor 9.

If such a network has supplied to it a voltage as shown in Fig. 3, the resistor 9 has its maximum value at the moments at which the current is minimum, so that the slope of the output voltage is considerably increased as compared with a voltage of the same output amplitude which is differentiated without the use of a voltage-dependent resistor.

If the oscillator 3 generates a sawtooth voltage having a substantially cosine-shaped variation during the fly-back, a voltage V ensues, as shown in Fig. 5.

Differentiating once provides the voltage V′ shown in Fig. 6, from which by differentiating another time the voltage V″ shown in Fig. 7 ensues, which is supplied to the phase-comparison stage 2, after being inverted in phase, if necessary.

In this circuit also a differentiating network having a voltage-dependent resistor may be used, that is to say in the second differentiating stage and hence the stage 4 which is arranged immediately before the phase-comparison stage 2.

What is claimed is:

1. A circuit-arrangement comprising a sawtooth oscillator adapted to produce a sawtooth oscillation which exhibits during its fly-back period a signal having a substantially cosine-shaped variation, a phase comparison stage, circuit means coupled between said oscillator and said phase comparison stage for converting said sawtooth oscillation into a voltage which is applied to said phase comparison stage and which is substantially zero before and after the fly-back period and which assumes a given value at the beginning of said period and which subsequently changes in a substantially cosine-shaped manner to a value of the opposite polarity to return substantially to zero at the end of said period, said circuit means comprising means coupled to said oscillator to derive a sine-shaped signal from the fly-back portion of said sawtooth oscillation and a differentiating circuit connected between said last-named means and said phase comparison stage, means for applying a pulsatory control voltage to said phase comparison stage to produce a control voltage at the output of said stage, and means for applying said control voltage to said sawtooth oscillator, whereby said sawtooth voltage is synchronized to said pulsatory control voltage.

2. A circuit-arrangement as set forth in claim 1, wherein said circuit means includes a differentiating network having a series-combination of a capacitor, a first resistor and a voltage-dependent resistor, the output voltage of said network being derived from at least a portion of said voltage-dependent resistor and being applied to said phase-comparison stage.

3. A circuit-arrangement as claimed in claim 1, in which said means to derive a sine-shaped signal comprises a differentiating circuit.

References Cited in the file of this patent

UNITED STATES PATENTS

| | | |
|---|---|---|
| Re. 21,400 | Blumlein | Mar. 19, 1940 |
| 2,179,607 | Bedford | Nov. 14, 1939 |
| 2,463,685 | Fredendall et al. | Mar. 8, 1949 |
| 2,570,013 | Hardenberg | Oct. 2, 1951 |